US007346452B2

(12) United States Patent
Ford et al.

(10) Patent No.: US 7,346,452 B2
(45) Date of Patent: Mar. 18, 2008

(54) INERTIAL GPS NAVIGATION SYSTEM USING INJECTED ALIGNMENT DATA FOR THE INERTIAL SYSTEM

(75) Inventors: Thomas John Ford, Calgary (CA); Jason Hamilton, Calgary (CA); Michael Bobye, Calgary (CA)

(73) Assignee: NovAtel, Inc., Calgary, Alberta (CA)

( * ) Notice: Subject to any disclaimer, the term of this patent is extended or adjusted under 35 U.S.C. 154(b) by 169 days.

(21) Appl. No.: 10/932,497

(22) Filed: Sep. 2, 2004

(65) Prior Publication Data

US 2005/0060093 A1    Mar. 17, 2005

Related U.S. Application Data

(60) Provisional application No. 60/500,804, filed on Sep. 5, 2003.

(51) Int. Cl.
*G01C 21/00* (2006.01)
(52) U.S. Cl. ............. 701/214; 342/357.11; 342/357.14
(58) Field of Classification Search ........... 342/357.11, 342/357.14; 701/214
See application file for complete search history.

(56) References Cited

U.S. PATENT DOCUMENTS

| 5,672,872 A * | 9/1997 | Wu et al. ................. 250/330 |
| 5,789,671 A | 8/1998 | Fernandez |
| 5,928,309 A | 7/1999 | Korver et al. |
| 5,941,935 A | 8/1999 | Fernandez |
| 6,094,163 A * | 7/2000 | Chang ................... 342/357.06 |

(Continued)

FOREIGN PATENT DOCUMENTS

WO    WO 01/94971 A1 *   12/2001

| WO | WO 02099453 A2 * | 12/2002 |
| WO | WO 2005024457 A1 * | 3/2005 |

OTHER PUBLICATIONS

Kim et al. "A complete GPS/INS Integration Technique Using GPS Carrier Phase Measurements", IEEE PLANS 1998, Apr. 20-23, 1998, pp. 526-533.*

(Continued)

*Primary Examiner*—James P. Trammell
*Assistant Examiner*—Daniel L Greene, Jr.
(74) *Attorney, Agent, or Firm*—Cesari and McKenna, LLP (57) ABSTRACT

An inertial ("INS")/GPS receiver uses injected alignment data to determine the alignment of the INS sub-system when the receiver is in motion during start-up. The alignment data is determined from parameterized surface information, measured GPS velocity, and a known or predetermined angular relationship between the vehicle on which the receiver is mounted and an inertial measurement reference, or body, frame associated with the accelerometers and gyroscopes of the inertial measuring unit ("IMU"). The parameterized surface information, which provides a constraint, may be the orientation of the surface over which the vehicle that houses the receiver is moving. The receiver uses the initial GPS position to determine the location of the vehicle on the parameterized surface, and thus, the known surface orientation. The receiver then determines the roll, pitch and heading of the vehicle on the surface using the associated GPS velocity vector. Thereafter, the receiver uses the calculated roll, pitch and heading of the vehicle and the known or predetermined angular relationship between the vehicle and the IMU body frame to determine a rotation matrix that relates the IMU body frame to a computation or referenced frame used by the receiver.

11 Claims, 5 Drawing Sheets

U.S. PATENT DOCUMENTS

| | | | |
|---|---|---|---|
| 6,191,732 B1* | 2/2001 | Carlson et al. | 342/357.06 |
| 6,657,584 B2 | 12/2003 | Cavallaro et al. | |
| 6,721,657 B2 | 4/2004 | Ford et al. | |
| 6,728,637 B2 | 4/2004 | Ford et al. | |
| 6,744,403 B2 | 6/2004 | Milnes et al. | |
| 7,009,558 B1* | 3/2006 | Fall et al. | 342/359 |
| 7,046,193 B2* | 5/2006 | Schipper et al. | 342/357.12 |
| 2002/0107636 A1* | 8/2002 | Ford et al. | 701/213 |
| 2002/0165669 A1 | 11/2002 | Pinto et al. | |

OTHER PUBLICATIONS

Kaplan et al: "Understanding GPS—Principles and Applications" Principles and Applications, Artech House Mobile Communications Series, Boston, MA: Artech House, US, 1996, pp. 395-408, XP002147231.

T. Ford, K. Milnes, article entitled "Track Model constraint Enhancement for NovAtel's OEM4", Proceedings of the International Symposium on Kinematic Systems in Geodesy, Geomatics and Navigation (KIS), Banff, Alberta, Jun. 2001.

T. Ford, K. Milnes, article entitled "GPS Positioning in the Fast Track: Track Model Constraint Enhancement for OEM4", Proceedings of ION GPS '01, Salt Lake City, Utah, Sep. 17-20, 2001, The Institute of Navigation, Washington, D.C., pp. 452.

T. Ford, J. Hamilton, article entitled "NovAtel Inc. New Positioning Filter: Phase Smoothing in the Position Domain", Proceedings of ION GPS '02, Portland, Oregon, Sep. 2002, The Institute of Navigation, Washington, D.C.

T. Ford, J. Hamilton, article entitled "A New Positioning Filter: Phase Smoothing in the Position Domain", NAVIGATION, Journal of the Institute of Navigation, vol. 50, No. 3, Summer 2003, pp. 65-78.

K. Milnes, T. Ford, article entitled "Real-Time GPS FX—On Screen Positioning of Racecars", GPS World, Sep. 2001.

T. Ford, J. Neumann, M. Bobye, article entitled "OEM4 Inertial: An Inertial/GPS Navigation System on the OEM4 Receiver", Proceedings of the Interntional Symposium on Kinematic Systems in Geodesy, Geomatics and Navigation (KIS, Banff, Alberta, Sep. 2001.

T. Ford, J. Neumann, M. Bobye, P. Fenton, article entitled "OEM4 Inertial: A Tightly Integrated Decentralised Inertial/GPS Navigation System", Proceedings of ION GPS '01, Salt Lake City, UT Sep. 17-20, 2001, The Institute of Navigation, Washington, D.C.

* cited by examiner

INERTIAL GPS NAVIGATION SYSTEM USING INJECTED ALIGNMENT DATA FOR THE INERTIAL SYSTEM

CROSS-REFERENCE TO RELATED APPLICATIONS

The present application claims the benefit of U.S. Provisional Patent Application Ser. No. 60/500,804, which was filed on Sep. 5, 2003, by Thomas John Ford et al. for an INERTIAL GPS NAVIGATION SYSTEM USING INJECTED ALIGNMENT DATA FOR THE INERTIAL SYSTEM and is hereby incorporated by reference.

BACKGROUND OF THE INVENTION

1. Field of the Invention

The invention relates generally to GPS receivers and, more particularly, to GPS receivers that incorporate inertial systems.

2. Background Information

A global positioning system (GPS) receiver requires signals from a number of GPS satellites in order to accurately calculate its position. The GPS receiver acquires and tracks signals consisting of carrier, pseudo random codes and modulated data from various satellites. The receiver correlates locally-generated codes with the codes received from the respective satellites to derive timing information relating the receiver time relative to the local generation of code chips to the satellite time at the times of the transmission of the corresponding code chips. The timing relationship between the receiver time and the transmission times of the various signals at the various satellites can be used in conjunction with the modulated data from the various satellites to generate a position of the receiver with respect to a reference frame shared with the satellites, for example, the earth centered earth fixed (ECEF) frame.

At least 4 satellites are required to provide a GPS position solution. Corrections to pseudo random measurements with respect to a fixed position, which is generated at a "base station" receiver, can be used to derive a relative position of the local receiver with respect to the base station position. Carrier measurements taken at the base station and the local receiver can be mixed in a known manner to generate precise relative position measurements, provided sufficient signals are available either instantaneously or over time to make it possible to resolve associated initial ambiguities of the carrier measurements. Specifically, the ambiguities can be used in conjunction with the current carrier measurements to generate the differences in geometric distances between the local receiver, the base station receiver and the various satellites whose signals are, at the time, being tracked by the two receivers.

The ambiguity resolution process typically takes between 30 seconds and 1 minute. The time the process takes is dependent on the number of satellites tracked with the process taking longer if only a relatively small number of satellites are being tracked.

If the GPS receiver does not, at any given time, receive the signals from a minimum number of satellites, the GPS receiver is unable to calculate position information. Thereafter, when the satellite signals are again available to the GPS receiver, that is, the satellites are "visible" to the receiver, the receiver must re-acquire the signals before the receiver can resume its position calculations. Signal re-acquisition involves re-synchronizing locally-generated codes to the codes in the received signals, in order to again track the signals. Following the signal re-acquisition process, the receiver must, when operating in precise differential mode, re-resolve the carrier ambiguities before precise positions become available.

During the re-acquisition operations, the user is without navigation information, and during the resolution process the user is without precise position information. Accordingly, the speed with which the receiver re-acquires the signals and resolves the carrier ambiguities is of paramount importance to the user.

The GPS satellites may become unavailable to the GPS receiver for various periods of time in, for example, urban environments, when the GPS receiver travels under a bridge, through a tunnel, or through what is referred to in the literature as an "urban canyon," in which buildings block the signals or produce excessively large multipath signals that make the satellite signals detrimental to use for position calculations. In addition, other environments, such as racetracks that include grandstands or high fences, may similarly block the signals and produce large multipath signals. Thus, operating the GPS receiver while passing through natural canyons and/or on race tracks or other areas in which satellite coverage is sparse, and so forth, may similarly result in the receiver being unable to track a sufficient number of satellites. Thus, in certain environments the navigation information may be available only sporadically, and GPS-based navigation systems may not be appropriate for use as a navigation tool.

One solution to the problem of interrupted navigation information is to use an inertial system to fill-in whenever the GPS receiver cannot observe a sufficient number of satellites. The inertial system has well known problems, such as the derivation of the initial system (position, velocity and attitude) errors as well as IMU sensor errors that tend to introduce drifts into the inertial position information over time. Accordingly, a system that uses GPS position information to limit the adverse effects of the drift errors on the position calculations in the inertial system has been developed. Further, such as system provides inertial position and velocity information to the GPS system, to aid in signal re-acquisition and in the process to resolve ambiguities. Such a system is described in U.S. Pat. No. 6,721,657 which is incorporated herein in its entirety by reference.

The patented combined GPS and INS system in real time combines the information from GPS and inertial sub-systems to aid in signal re-acquisition and in the resolution of associated carrier ambiguities. The INS/GPS receiver thus provides accurate and uninterrupted navigation information in an environment in which sufficient numbers of GPS satellites are not continuously in view. The combined system has been improved by modifying the INS Kalman filter to include GPS and/or other observables, i.e., measurements, that span previous and current times. The INS Kalman filter utilizes the observables to update position information relating to previous and current positions and propagate current position, velocity and attitude related information. The INS/GPS receiver thus produces even more accurate estimates of inertial position and velocity in the environment in which sufficient numbers of GPS satellites are not continuously in view. The improved system is described in co-pending patent application entitled INERTIAL GPS NAVIGATION SYSTEM WITH MODIFIED KALMAN FILTER Ser. No. 10/758,363 filed Jan. 15, 2004.

The INS/GPS systems described above work well in environments in which the INS system alignment can be established when the receiver is stationary. The alignment of the INS system is often derived with a combination of the accelerations as measured by the INS system and compared with the gravity vector, and the angular rate measured by the INS system and compared to the earth rate. The computation requires that the INS system not experience any specific forces except gravity and not be physically rotating except from earth rotation. Further, the computation requires that the gyro bias in the unit is small compared to the earth rate.

In environments in which the receiver is not stationary at start-up, for example, in a race car that rolls out of a garage (no GPS) and onto a race track, the INS system alignment must be obtained when the receiver is moving at a relatively high rate of speed and around corners. In such environments the INS system senses significant non-vertical specific forces and motion induced rotation. Accordingly, the standard method for alignment could, under these circumstances, easily give roll and pitch errors of 45 degrees or more. This type of initial error leads to non-linear errors in the Kalman filter estimators, which causes the filter to take a prohibitively long time to estimate its system errors well enough to make the system useful.

SUMMARY OF THE INVENTION

The invention is an inertial ("INS")/GPS receiver and a method of operating the receiver that uses injected alignment data to determine the alignment of the INS sub-system when the receiver is in motion during start-up. The alignment data is determined from parameterized surface information, measured GPS velocity, and a known or predetermined angular relationship between the body frame of the inertial measuring unit ("IMU") and the vehicle on which the receiver is mounted.

The parameterized surface information may be, for example, the orientation of the surface upon which the vehicle moves, that is, the road or in the example discussed below the racetrack over which the vehicle is being driven. The parameterized surface information provides a constraint in a direction that is normal to the road or track surface. In the example, a model of the race track surface is used in which respective contiguous planar sections are assigned planar section frames that are based on an orthogonal triad of axis in which the z-axis is normal to the surface. The geometries of the respective planar sections are used to determine associated rotation matrices $R_p^l$ for rotating the planar surface frames to the geographic (ie local level frame), which is a right-handed frame in which the y-axis points north. The rotation matrix that rotates the local level frame to the ECEF frame is known.

The receiver uses the initial GPS position to determine the location of the vehicle on the parameterized surface, that is, to determine in which planar section the vehicle is "located." The receiver also determines the orientation of the vehicle using the associated GPS velocity vector, which is defined in terms of the local level frame. To do this the INS sub-system transforms the GPS velocity vector to a velocity vector $v^p$ in the applicable planar section frame using a rotation matrix $R_l^p$, which is the transpose of the $R_p^l$ matrix associated with the planar section by the surface model.

The z component of the transformed velocity vector is then set to zero, since the vehicle is constrained to traveling on the surface plane of the planar section. The system thereafter determines "pitch" and "roll" vectors for the vehicle in the planar section frame, and uses the associated rotation matrix $R_p^l$ to transform the vectors to corresponding vectors in the local level frame. The pitch and roll vectors parameterized in the local level frame represent a vehicle frame axis, and the system uses this axis to determine the Euler angles that relate the vehicle frame to the local level frame. Using those Euler angles, the system further calculates a rotation matrix $R_v^l$ for transforming a vector from the vehicle frame to the local level frame.

The system has also calculated a rotation matrix $R_v^b$ to transform a vector from the vehicle frame to the IMU body frame, using data provided by a user or data gathered over time when the system was previously aligned and the vehicle was at a known orientation. The system then uses the various calculated and known rotation matrices and/or the corresponding transpose matrices, namely, the matrices associated with transforming vectors from the IMU body frame to the vehicle frame, from the vehicle frame to the local level frame, and from the local level frame to the ECEF frame, to calculate a rotation matrix for transforming a vector from the IMU body frame to the ECEF frame. Thereafter, the system uses the IMU measurements and the GPS measurements, all of which are translated to the ECEF frame, to determine the navigation information in a known manner.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
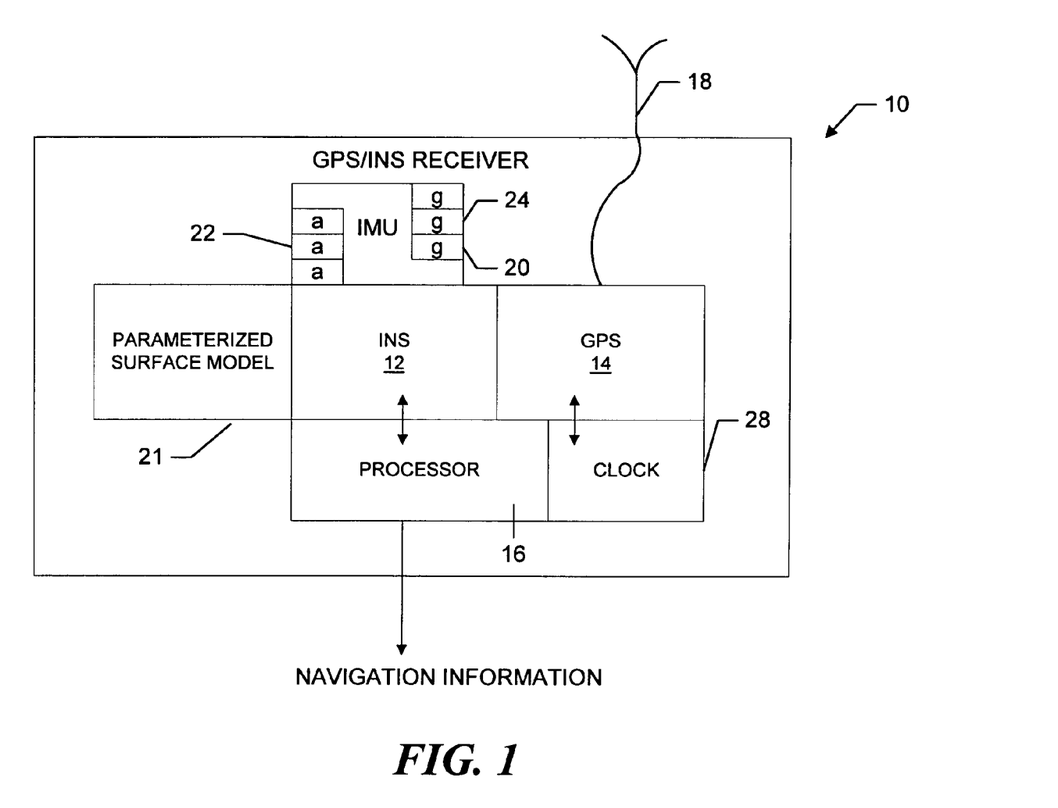
FIG. 1 is a functional block diagram of a GPS/INS receiver constructed in accordance with the invention.

Referring now to FIG. 1, a GPS/INS receiver 10 includes an INS sub-system 12 and a GPS sub-system 14 that operate under the control of a processor 16, to calculate GPS position and INS position, velocity and attitude information. The GPS subsystem processes the satellite signals received over an antenna 18. The INS sub-system receives measurements from an inertial measuring unit ("IMU") 20 that reads data from orthogonally positioned accelerometers 22 and gyroscopes 24. The data from the IMU are time tagged using the time maintained by a clock 28, such that the two sub-systems can reliably interchange position-related information that is synchronized in time. Preferably, the clock 28 maintains GPS time. The two subsystems operate together, through software integration in the processor 16, to provide position-related information between the sub-systems as predetermined times and/or in response to particular events. Further, the GPS sub-system may provide GPS observables, such as delta phase measurements, to the INS sub-system at appropriate times. After processing, the receiver provides navigation information, such as position, velocity and/or attitude, to the user by, for example, transmitting the information to a display device (not shown).

For ease of understanding, we discuss the processing operations of the two sub-systems without specific reference to the processor 16. The system may instead include dedicated GPS and INS sub-processors that communicate with one another at appropriate times to exchange information that is required to perform the various GPS and INS calculation operations discussed below. For example, the INS sub-processor communicates with the GPS sub-processor when the IMU data are provided to the INS sub-processor, in order to time-tag the data with GPS time. Further, the GPS sub-processor communicates with the INS sub-processor to provide the GPS observables, as appropriate, and the GPS position information at the start of each measurement interval, and so forth.

At start-up, the GPS sub-system 14 operates in a known manner to acquire the signals from at least a minimum number of GPS satellites and calculate pseudoranges to the respective satellites and associated Doppler rates. Based on the pseudoranges, the GPS sub-system determines its position relative to the satellites. The GPS sub-system may also determine its position relative to a fixed-position base receiver (not shown), either through the use of differential correction measurements generated at the base station or after resolving associated carrier cycle ambiguities.

At the same time, the INS sub-system 12 processes the IMU data, that is, the measurements from the various accelerometers 22 and gyroscopes 24, to determine the initial attitude and velocity of the receiver. As discussed below with reference to FIGS. 2 and 4, the INS sub-system alignment is determined using either the IMU data or injected alignment data, depending on whether the receiver is at rest, i.e., stationary, or in motion during the start-up processing. As also discussed in more detail below, the injected alignment data is calculated by the INS sub-system using parameterized surface information that is associated with a surface model 21. The INS sub-system further processes both the IMU data, the GPS position and associated covariance information, and as applicable GPS observables, to set up various matrices for an INS Kalman filter (not shown). At the start of each measurement interval, the INS sub-system updates the INS Kalman filter with GPS or other related measurements and provides updated error states to a mechanization process. The mechanization process uses the updated information and the IMU data to propagate, over the measurement interval, the inertial current position, attitude and velocity related information. It is via the Kalman updating process that the associated inertial position and velocity errors are controlled by GPS and other observables at each measurement interval.

A. At Rest INS Sub-System Alignment

Figure 2:
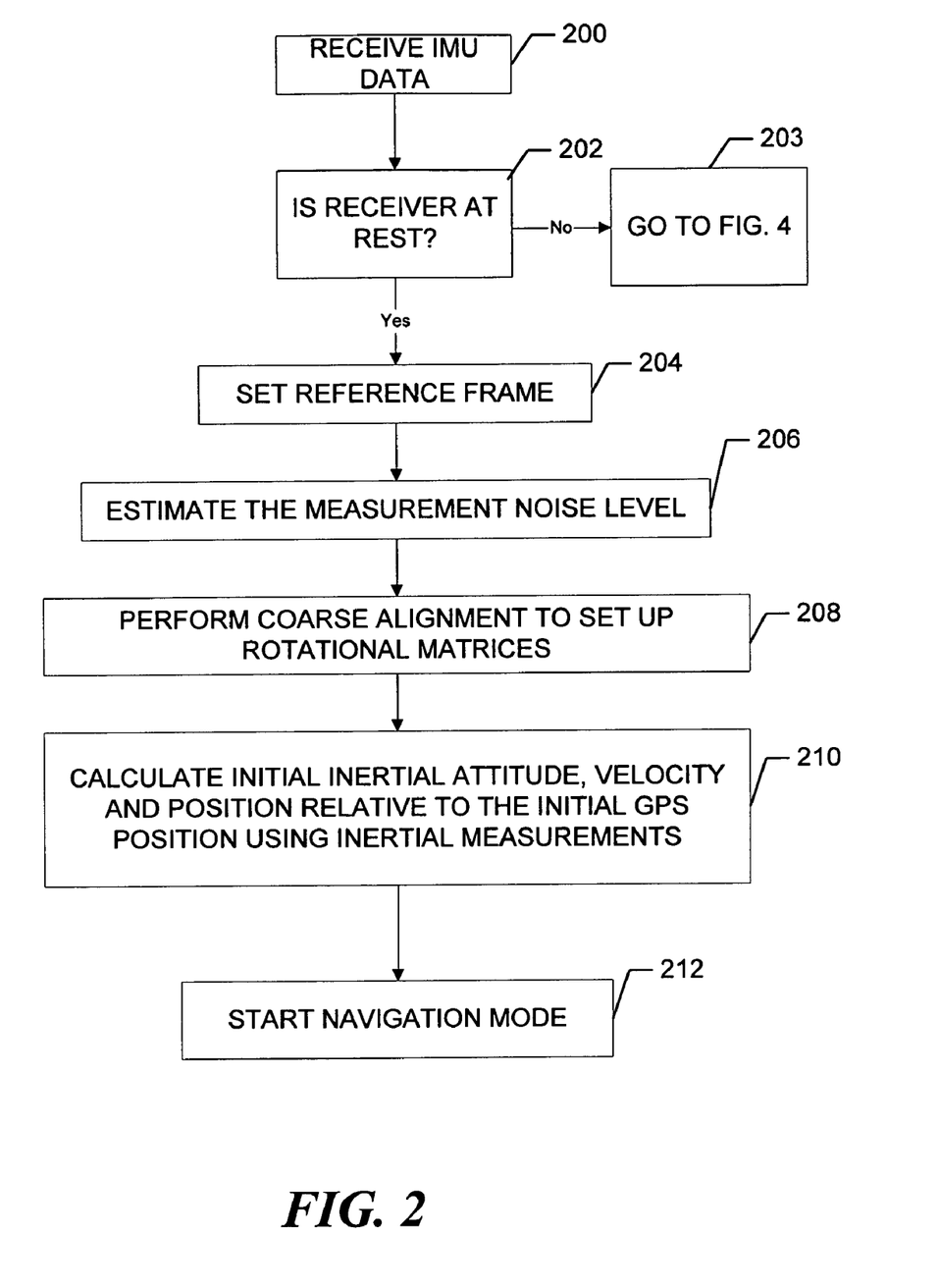
FIG. 2 is a flow chart of the INS sub-system start-up processing for a receiver at rest.

Referring now also to FIG. 2, if the receiver 10 is at rest during start-up (steps 200, 202), the INS sub-system 12 uses the IMU data to determine the orientation of a measurement reference, or body, frame for the accelerometer and gyroscope measurements (step 204). The INS sub-system thus calculates the initial attitude represented as Euler angles relating the body frame to the ECEF frame. The system must set the orientation of the y-axis of the body frame such that the y-axis is not close in alignment to the z-axis (i.e., the gravity vector) of the local level frame. Otherwise, the associated rotation matrix relating the body frame to the local level frame cannot be properly populated because meaningful pitch, roll and heading values cannot be determined.

To set the orientation of the reference frame such that the y-axis does not align with the gravity vector, the INS sub-system 12 compares the measurements from the various accelerometers, which are nominally assigned to x, y and z axes, to determine which measurement is largest in magnitude. The INS sub-system then re-assigns or maps the x, y and z axes among the accelerometers and gyroscopes such that the z-axis has the largest positive acceleration magnitude, that is, such that the z-axis points up. The INS sub-system will then properly estimate the initial attitude, regardless of how the receiver is oriented.

The IMU 20 plugs into a port (not shown) of the processor 16 and through the port supplies accelerometer and gyroscope measurement data to the processor. The INS sub-system assigns applicable initial uncertainty values and a scale factor that correspond to the particular IMU in use to the INS system elements and raw IMU measurements, respectively.

The INS sub-system estimates the noise level on the IMU measurements (step 206) based on the standard deviation of the measured accelerometer signals. If the receiver moves before the noise level estimation is completed, the process uses as the estimate the nominal noise level value specified by the IMU manufacturer.

The steps 204 and 206 occur essentially simultaneously. Once the reference frame and noise level are determined, the INS sub-system 12 begins a coarse alignment process (step 208). The coarse alignment process sets up various rotational matrices that are used to transform measurement data to a computational frame, which in the example is the earth centered earth fixed, or ECEF, frame. The coarse alignment process is based on an assumed "local" position of the receiver, which is the initial GPS position provided by the GPS sub-system 14. The INS subsystem specifies three orthogonal vectors that are associated with the local position, namely, the gravity vector, the earth angular velocity vector, and the cross product of the two vectors. The INS sub-system then determines the same vectors and their cross product transformed to the reference, or body, frame, based on the measurements of the accelerometers 22 and gyroscopes 24. The two sets of three vectors form two matrices $S^l$ and $S^b$ which are related by the transformation:

$$S^b = R_l^b S^l \text{ or } (S^b)^T = (S^l)^T R_b^l$$

where $R_l^b$ is the rotation matrix used to transform vectors from the local level to the reference, or body, frame, and $R_b^l$ is the transpose of the rotation matrix:

$$R_b^l = ((S^l)^T)^{-1}(S^b)^T$$

Once $R_b^l$ is computed, the INS sub-system calculates a rotation matrix $R_b^e$, which is used to rotate the body frame measurements to the computational (ECEF) frame:

$$R_b^e = R_l^e R_b^l$$

The system also uses specific elements of the matrix $R_b^l$ to generate roll, pitch and azimuth state elements:

Pitch=Arc Sin($R_{3,2}$)=Arc Sin($-f_y/g$)

Roll=Arc Tan($-R_{3,1}$, $R_{3,3}$)=Arc Tan($f_x/g$, $-f_z/g$)

Heading=Arc Tan(($f_x\omega_z-f_z\omega_x$)/($Wg$ Cos($\phi$)), ($Wf_y$ Sin($\phi$)+$\omega_y g$)/($Wg$ Cos($\phi$)))

where $f_x$, $f_y$, $f_z$ are specific forces measured in the body frame by the IMU, $\omega_x$, $\omega_y$, $\omega_z$ are angular rates measured in the body frame by the IMU, W is the earth rotation rate, g is the magnitude of normal gravity, and $\phi$ is latitude.

The alignment accuracy over time is dependent on the noise on the gyroscope measurements and in particular on the noise on $\omega_x$ when the reference frame is aligned such that $\omega_x$ points east. Accordingly, the INS sub-system 12 uses the estimated noise level determined in step 206 in calculating the initial attitude and velocity. The initial GPS position is used to initialize the position element of the INS sub-system (step 210).

The coarse alignment process for the at rest receiver ends after the earlier of a fixed length of time after the calculation of an initial GPS position or the system begins to move. As part of the coarse alignment, the attitude accuracy and INS measurement noise level is computed. After coarse alignment, the INS sub-system operates in navigation mode (step 212), to propagate the inertial system parameters of current position, velocity, attitude and bias estimates using a Kalman filter process and a mechanization process in a known manner.

B. In Motion INS Sub-System Alignment

If the receiver is in motion during start-up (steps 200, 202, 203), the INS sub-system 12 determines IMU body frame alignment using injected alignment data. The sub-system determines the alignment data based on parameterized surface information, measured GPS velocity and a predetermined angular relationship between the IMU body frame and the vehicle in which the receiver is installed. The angular relationship between the IMU body frame and the vehicle may be based on user supplied information or it may be based on data gathered over time when the system was previously aligned and the vehicle was at a known orientation. We discuss the start-up process in more detail below with reference to FIG. 4 and with reference to FIG. 5 how the angular relationship between the IMU body frame and the vehicle is determined from data gathered over time.

Figure 3:
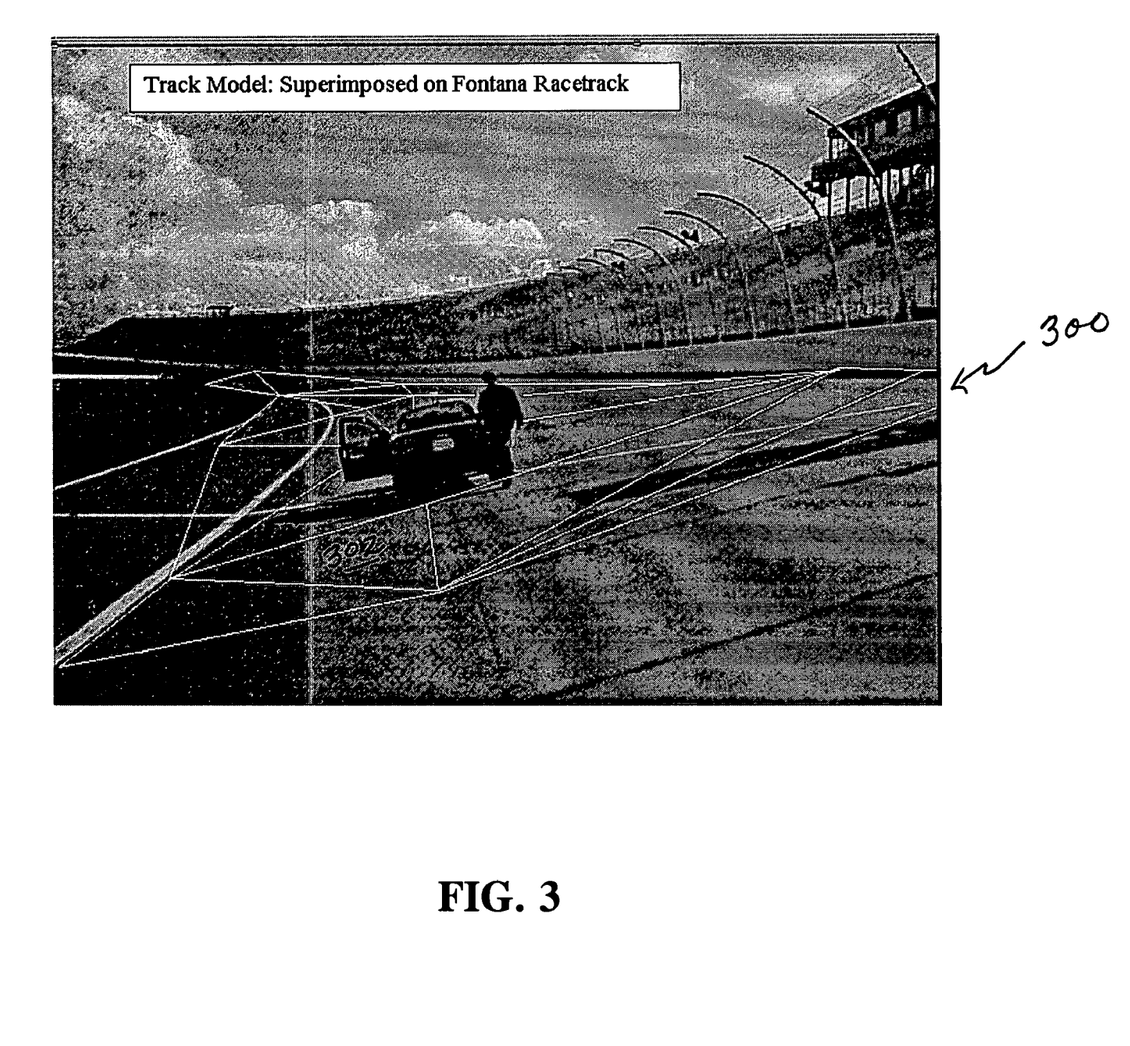
FIG. 3 is an illustration of a surface model for use in providing parameterized surface information.

An example of a surface model used to provide parameterized surface information is shown in FIG. 3. A model 300 of a portion of a racetrack includes contiguous planar sections 302, each with a known orientation. In the example the planar sections are in the shape of triangles, however, the sections may have various shapes. The orientations and the lay-out of the planar sections are determined using aerial photogrammetry techniques in this case, but other methods can be used to determine these geometries.

In the positioning calculations, each of the respective triangles provides a constraint in a direction normal to the surface plane of the triangle. Specifically, while the GPS receiver antenna is "within" a given triangle, the position of the antenna is constant in the direction normal to the surface plane. The antenna height is fixed relative to the vehicle, here the race car, and thus, a planar constraint can be defined with respect to the triangle, or planar section 302.

Each planar section 302 is assigned an orthogonal triad of axes that form a planar section frame. The geometry of a given triangle can be used to determine a rotation matrix $R_p^l$ that rotates the planar section frame to the geographic or local level frame, which is a right-handed frame that has its y-axis pointing north. The system precalculates the rotation matrices $R_p^l$ for the respective planar sections, and also the transpose matrices $R_l^p$ that rotate the local level frame to the respective planar section frames. In addition the system has stored the rotation matrix $R_l^e$ that rotates the local level frame to the reference ECEF frame.

Figure 4:
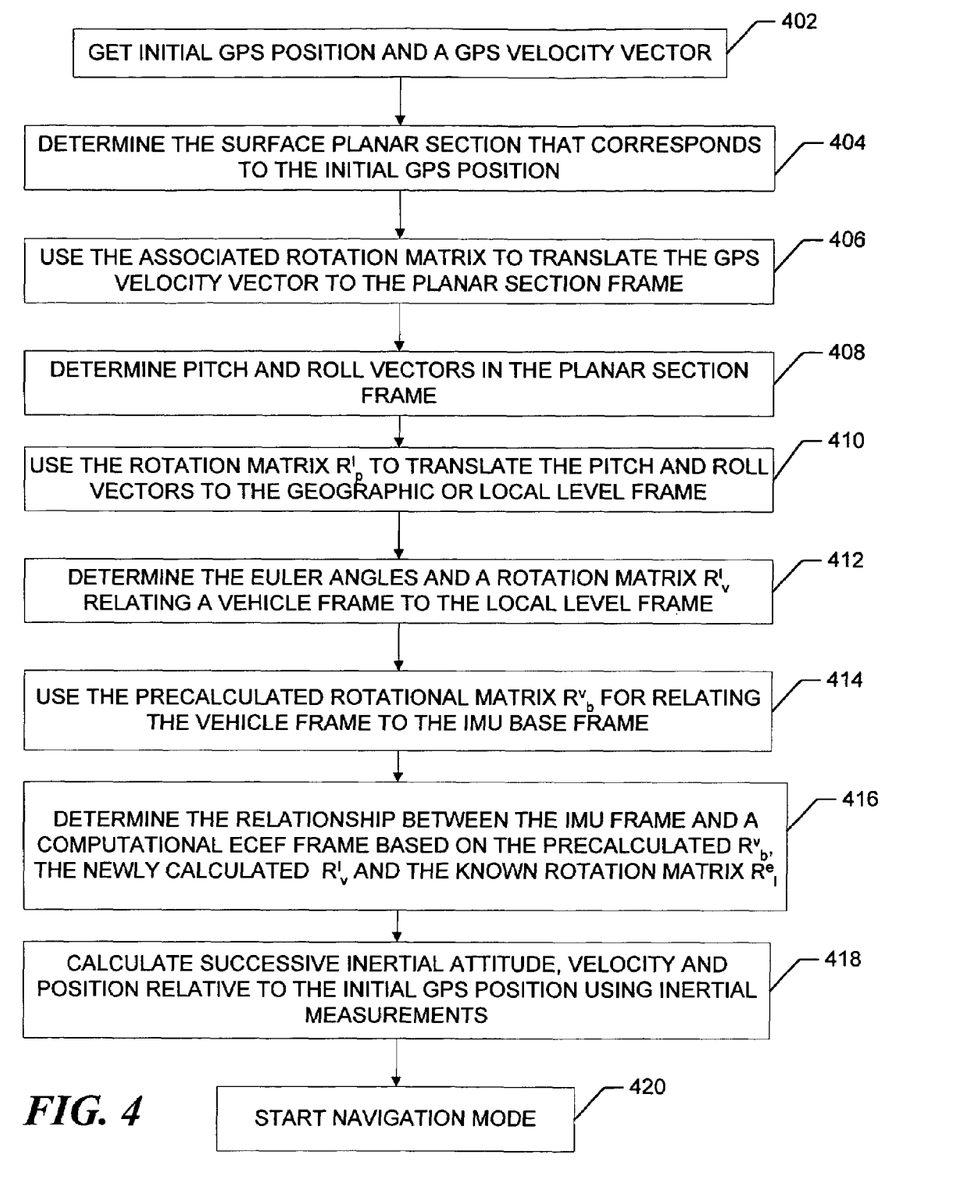
FIG. 4 is a flow chart of INS sub-system start-up processing for a receiver in motion.

Referring now to FIG. 4, when the receiver 10 is in motion at start-up, the GPS sub-system 14 provides an initial GPS position and a GPS velocity vector $v^l$ that are parameterized in the geographic or local level frame (step 402). Based on the initial GPS position, the INS sub-system determines the applicable planar section 302 (step 404). Using the rotation matrix $R_l^p$ calculated for that planar section, the sub-system transforms the velocity vector $v^l$ to the planar section frame (step 406):

$$v^p = R_l^p v^l$$

$$\text{where } v^p = \begin{bmatrix} v_x^p \\ v_y^p \\ v_z^p \end{bmatrix}$$

Under the assumption that the vehicle is traveling on the race track, i.e., parallel to the planar surface, the z component of the velocity vector $v^p$ can be set to zero:

$$v^p = \begin{bmatrix} v_x^p \\ v_y^p \\ 0 \end{bmatrix}$$

The vector $v^p$ is parallel to the y-axis of a vehicle frame, which is defined by a triad of orthogonal axes with the y-axis directed ahead, the z-axis directed up and the x-axis directed to the driver's right. The inclination of the velocity vector in the local level frame is the pitch angle of the vehicle, and thus, the corresponding vector in the planar section frame is a "pitch" vector (step 408). If the velocity vector is rotated −90° about the z-axis in the planar section frame, the result is a vector that is parallel to the x-axis of the vehicle frame and the inclination of this rotated vector in the local frame is equal to the roll angle of the vehicle. Thus, the "roll" vector in the planar section frame is (step 408):

$$v^{PR} = R_3\left[-\frac{\pi}{2}\right]\begin{bmatrix} v_x^p \\ v_y^p \\ 0 \end{bmatrix} = \begin{bmatrix} v_y^p \\ -v_x^p \\ 0 \end{bmatrix}$$

where $R_3$ is the rotation matrix associated with rotation about the z axis. Since the rotation matrix $R_l^p$ is known, the pitch and roll vectors in the planar section frame can be readily transformed to pitch and roll vectors in the local level frame (step 410):

$$v^{lp} = R_p^l v^{Pp} \text{ and } v^{lr} = R_p^l v^{PR}$$

The pitch and roll vectors in the local level frame represent a vehicle frame axis from which the Euler angles relating the vehicle frame to the local level frame can be derived (step 412):

Given the roll vector $$v^{lr} = \begin{bmatrix} v_x^{lr} \\ v_y^{lr} \\ v_z^{lr} \end{bmatrix}$$

the roll and heading can be generated as follows:

$$\beta = \text{ArcSin}\left(\frac{v_z^{lr}}{\|v^{lp}\|}\right)$$

and $$\gamma = \text{ArcTan2}(v_x^{lr}, v_y^{lr}).$$

The pitch can be computed from the local level pitch vector as:

$$\alpha = \text{ArcSin}\left(\frac{v_z^{lp}}{\|v_p^l\|}\right)$$

Using the calculated Euler angles αβγ, the rotation matrix $R_v^l$ for transforming a vector from the vehicle frame to the local level frame can be computed in a known manner As discussed above, the rotation matrix $R_l^e$ to transform a vector from the local level frame to the ECEF frame is known. Further, the rotation matrix $R_b^v$ to transform a vector from the IMU body frame to the vehicle frame is known, i.e., the matrix is pre-calculated using either user supplied data or data gathered during system operations. Using these known matrices and the newly calculated rotation matrix $R_v^l$, the sub-system computes the rotation matrix $R_b^e$ relating the IMU body frame and the ECEF frame as:

$$R_b^e = R_l^e R_v^l R_b^v$$

The sub-system then determines the Euler angles or components of the rotation quaternion relating the two frames in a known manner, based on the calculated rotation matrix $R_b^e$.

With the receiver in motion, the INS sub-system uses the nominal noise level value specified by the IMU manufacturer as the estimated noise level for the IMU measurements. Using the alignment, GPS velocity and GPS position, the INS sub-system calculates its successive attitude, velocity and position from the inertial measurements and begins operating in the navigation mode (step 420).

Figure 5:
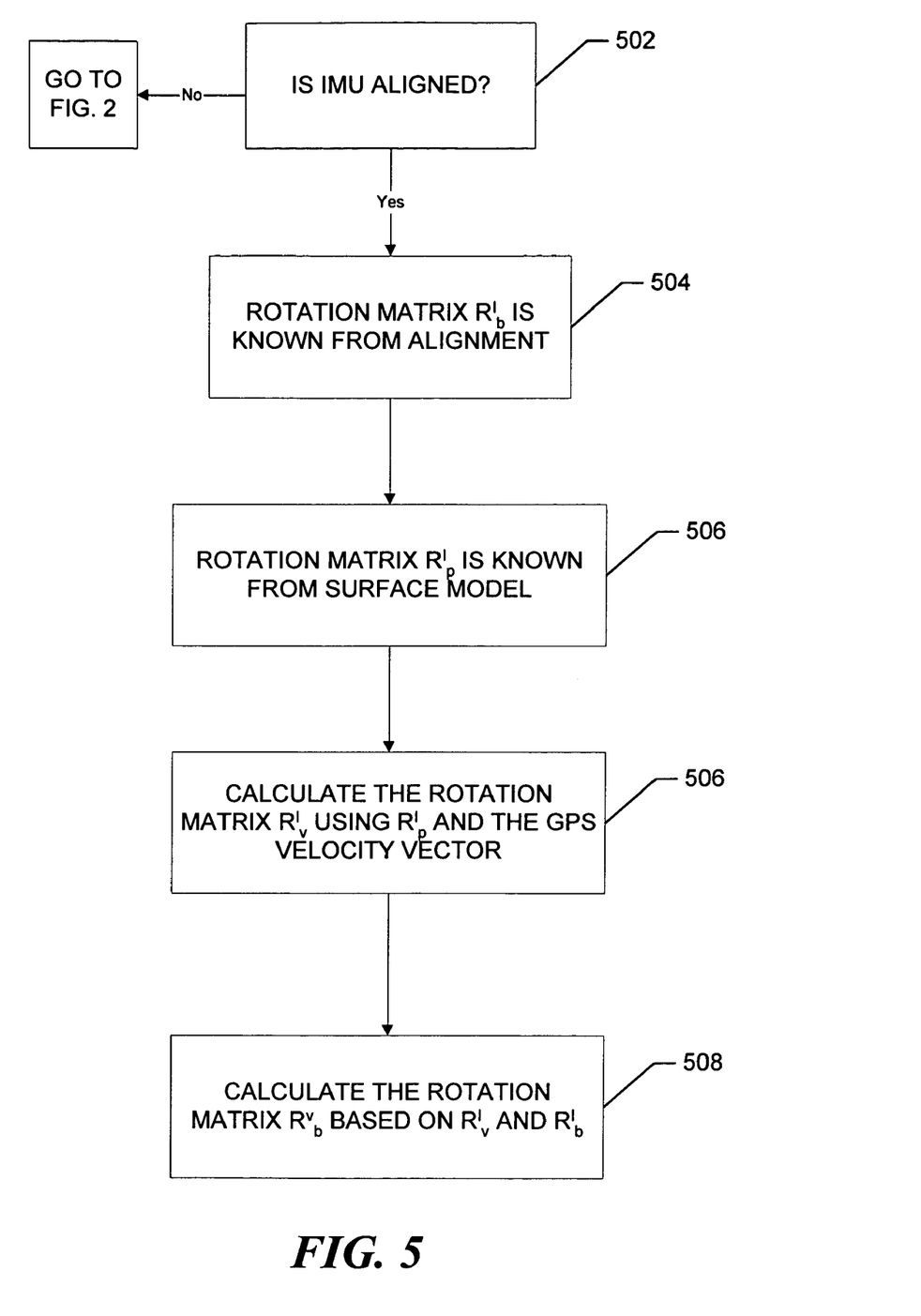
FIG. 5 is a flow chart of INS sub-system operations to determine alignment data for future use.

Referring now to FIG. 5, we discuss how the rotation matrix $R_b^v$ is calculated using data gathered over time. When the INS sub-system is aligned (step 502) and the vehicle is moving over a surface with a known orientation, such as a surface that corresponds to a planar section 302 of the surface model 300 (FIG. 3), both the IMU body frame to local level frame rotation matrix $R_b^l$ and the planar section frame to the local level frame rotation matrix $R_p^l$ are known (steps 504, 506). The INS sub-system can then calculate the rotation matrix $R_v^l$ that relates the vehicle frame and the local level frame using the rotation matrix $R_p^l$ and the GPS velocity vector, and based on the assumptions that (i) the velocity vector and the vehicle frame y-axis, which points ahead of the vehicle, are parallel, and (ii) the x and y axes of the vehicle frame are parallel to the surface plane of the planar section (step 508). The system can also calculate the rotation matrix $R_b^v$ that relates the IMU body frame to the vehicle frame (step 510) based on:

$$R_b^l = R_v^l R_b^v$$

and thus $$R_b^v = R_l^v R_b^l$$

The sub-system then determines the Euler angles αβγ linking the IMU body frame to the vehicle frame based on the calculated rotation matrix $R_b^v$. Over time, the sub-system performs the same calculations to determine the Euler angles based on the rotation matrices associated with various planar sections. Then, disregarding the outliers, the sub-system averages the values, to more robustly define the angular relationship. The system then stores these values in a memory (not shown) for later use with "on-the-fly" alignment operations, that is, alignment operations that occur when the receiver is in motion.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention, including using other types of parameterized surface information from which the INS sub-system may then calculate the orientation of the surface on which the vehicle is moving. In addition, the receiver may use other frames, and/or convert vectors or measurement data from one frame to another frame at different steps in the calculations, and so forth.

What is claimed is:

1. A method of determining the alignment of an inertial measurement unit of an inertial/GPS receiver that is in motion at start-up, the method including:
    A. receiving signals from a plurality of GPS satellites;
    B. acquiring and tracking carriers and codes in the satellite signals;
    C. determining a GPS position and an associated GPS velocity vector;
    D. identifying a location on a surface model that corresponds to the GPS position and determining the relative orientation of a corresponding surface plane;
    E. using the orientation of the surface plane and the GPS velocity vector to determine pitch, roll and heading of a vehicle on which the receiver is mounted;
    F. using the pitch, roll and heading information and information about an angular relationship between the vehicle and a body frame associated with the inertial measurement unit to determine an angular relationship between the inertial measurement unit body frame and a reference frame;
    G. using GPS measurements and inertial measurements to determine one or more of the position, velocity and attitude of the vehicle; and
    H. displaying one or more of the position, velocity and attitude of the vehicle.

2. The method of claim 1 further including in the step of determining pitch, roll and heading
    translating the GPS velocity vector to a vector in a planar section frame associated with the surface plane and determining pitch and roll vectors in the planar section frame,
    transforming the pitch and roll vectors from the planar section frame to a local level frame; and
    calculating the pitch, roll and heading values using the components of the pitch and roll vectors parameterized in the local frame.

3. The method of claim 2 wherein the planar section frame has a triad of orthogonal axes with a z-axis normal to the surface plane and the step of translating the GPS velocity vector further includes setting the z component of the GPS velocity vector parameterized in the planar section frame to zero to determine the pitch vector.

4. The method of claim 3 further including determining the roll vector parameterized in the planar frame section by rotating the pitch vector about the z-axis.

5. The method of claim 1 wherein the step of determining the angular relationship between the inertial measurement unit body frame and the reference frame includes
    calculating a rotation matrix $R_v^l$ that relates a vehicle frame and the local level frame based on the pitch, roll and heading values, calculating a rotation matrix $R_b^v$ that relates the inertial measurement unit body frame to the vehicle frame based on the angular relationship between the vehicle and the inertial measurement unit body frame, calculating a rotation matrix $R_b^e$ that relates the inertial measurement unit body frame to the reference frame based on the calculated matrices $R_v^l$ and $R_b^v$, and a known rotation matrix $R_l^e$ that relates the local level frame to the reference frame.

6. The method of claim 1 wherein the information about the relationship between the vehicle frame and the inertial measurement unit body frame that is used in the step of determining the angular relationship between the inertial measurement unit body frame and the reference frame is based on data gathered when the inertial measurement unit was aligned previously and the vehicle was on a surface with a known orientation.

7. The method of claim 1 wherein the information about the relationship between the vehicle frame and the inertial measurement unit body frame that is used in the step of determining a relationship between the inertial measurement unit body frame and the reference frame is based on information supplied by the user.

8. The method of claim 1 further including the step of determining alignment of the inertial measurement unit when the receiver re-starts in a stationary state using measurements made by the inertial measurement unit.

9. The method of claim 6 further including in the step of determining the angular relationship between the vehicle and the inertial measurement unit body frame the steps of calculating a rotation matrix $R_v^l$ based on the GPS velocity vector, with the y axis of the vehicle frame being parallel to the GPS velocity vector and the x and y axes of the vehicle frame being parallel to the surface plane, and calculating $R_b^v = R_l^v R_b^l$ where $R_l^v$ is the transpose of $R_v^l$ and $R_b^l$ is known from the alignment.

10. The method of claim 7 further including the step of determining a relationship between the inertial measurement unit body frame and the reference frame when the receiver re-starts in a stationary state using measurements made by the inertial measurement unit.

11. The method of claim 7 wherein the information about the relationship between the vehicle frame and the inertial measurement unit body frame that is used in the step of determining the angular relationship between the inertial measurement unit body frame and the reference frame after a loss of alignment is based on data gathered when the inertial measurement unit was aligned previously and the vehicle was on a surface with a known orientation.

* * * * *